United States Patent [19]

Pepin

[11] 3,802,413

[45] Apr. 9, 1974

[54] CAMPING AND BARBECUE STOVES

[76] Inventor: Normand Pepin, 127, 10 ieme Avenue Sud, Sherbrooke, Quebec, Canada

[22] Filed: Apr. 6, 1972

[21] Appl. No.: 241,582

[52] U.S. Cl............... 126/25, 126/25 B, 126/41 R
[51] Int. Cl. ............................................ A47j 37/00
[58] Field of Search............ 126/25 B, 41 R, 38, 25, 126/25 A; 110/1 F

[56] References Cited
UNITED STATES PATENTS

| | | | |
|---|---|---|---|
| 2,907,316 | 10/1959 | Windust | 126/38 |
| 3,396,715 | 8/1968 | Allen | 126/25 B |
| 1,735,151 | 11/1929 | Blaskewitz et al. | 126/38 |
| 2,790,434 | 4/1957 | Del Francia | 126/41 |
| 3,295,509 | 1/1967 | Harvey | 126/25 B |

Primary Examiner—Carroll B. Dority, Jr.

[57] ABSTRACT

A versatile portable cooking stove that offers the possibility of being used as such or as a barbecue through the provision of an integrally formed spit on the reverse side thereof; at every burner position, there is provided at least one reversibly mounted heating element so that the heat produced thereby may be used for cooking in the usual way or for starting the combustion of the charcoal in the barbecue spit when applied against the bottom sheet metal surface of said spit; if the heating element is disposed on one side of a reversible and retractable mounting plate, a second element may be disposed on the other side thereof; said second element being of a different kind than the first mentioned makes it conveniently possible for the user to select among modes of operation the one most suitable, i.e. any of a number of fuel fired or electrically heated modes.

3 Claims, 10 Drawing Figures

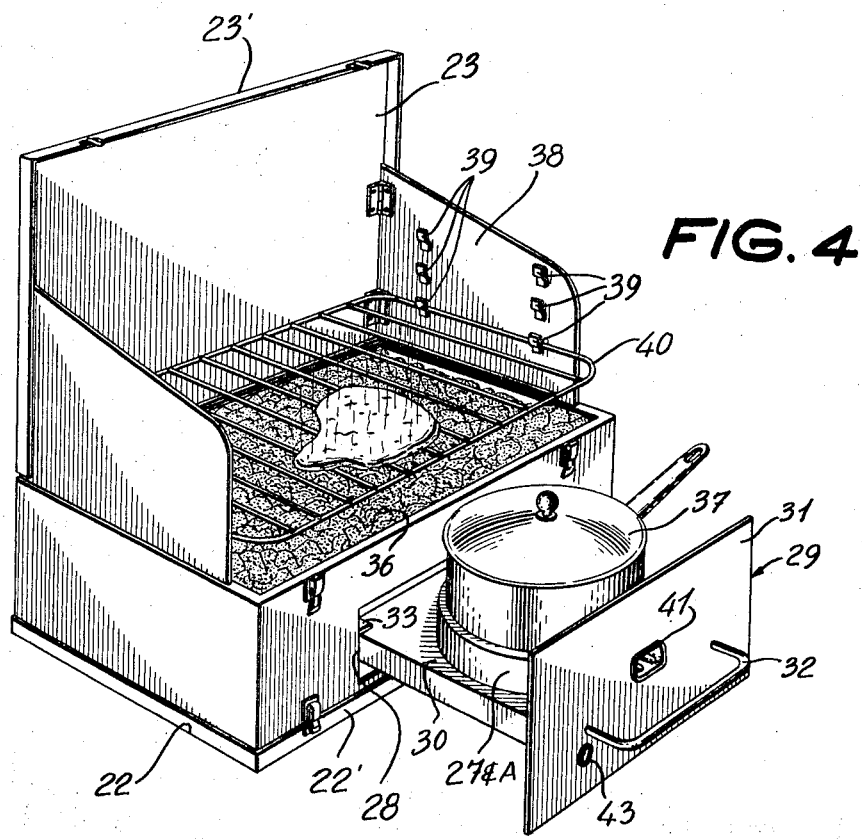
FIG. 4
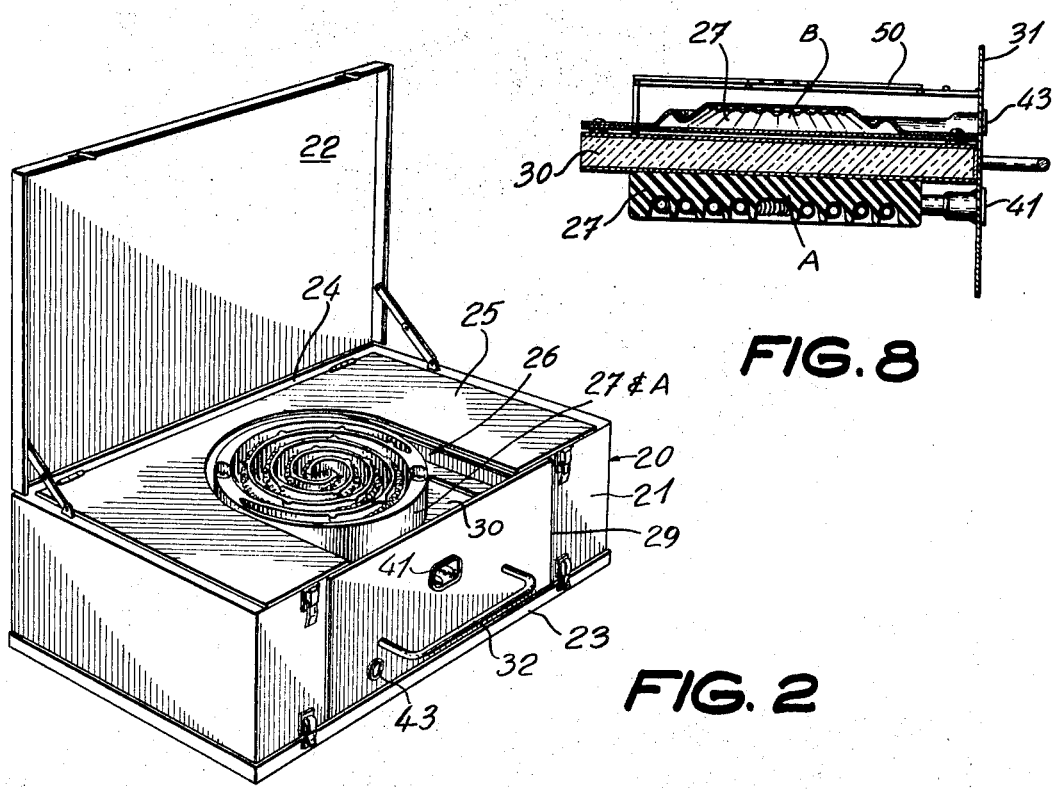
FIG. 8
FIG. 2

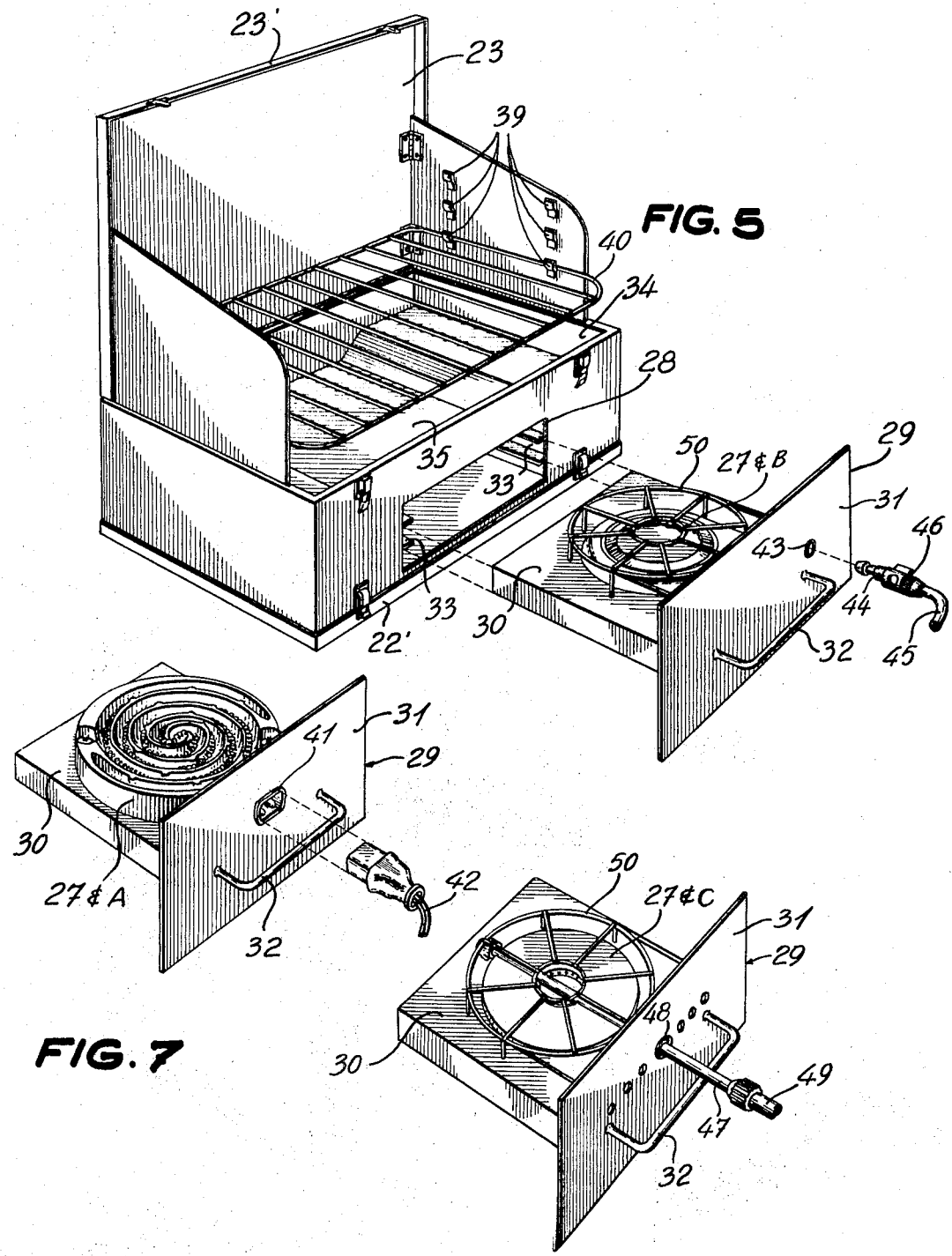

CAMPING AND BARBECUE STOVES

My invention relates to an improvement in barbecue fire starting means, to the improved barbecue spits utilizing same and to an original structure for a combined stove and barbecue spit wherein advantageous utilization of these fire starting means is made.

An important object of the invention is to overcome and avoid some of the drawbacks of the known methods and means used for starting barbecue fires, i.e. igniting charcoal. There are mainly two know and commonly used methods for starting barbecue fires. The first of these consists in setting aflame a combustible fluid that has previously been sprinkled liberally over the charcoal; the combustible fluid used is generally an organic product and preferably one that does not ignite explosively. Such fuels are commercially available and sold for this specific purpose.

The other fire starting method consists in using an electric heating element and immersing it in the charcoal; such elements are well-known and commercially available.

The main drawback of the starting fuels stems from the fact that most of the fuel is usually absorbed into and by the upper layer of the charcoal and no longer available for sustaining the flame combustion and heat needed for setting the charcoal pieces aglow; thus it is always necessary to use an excess of the starting fuel, and the portion thereof that has been absorbed by the charcoal remains to contaminate the charcoal fire for a period of time until the charcoal pieces have reached a high enough temperature to cause it to evaporate and escape as foul smelling vapors of unburned fuel. The starting fuels are somewhat ineffective for another reason also; at best they succeed in setting aglow only a few spots of the uppermost pieces of charcoal and, in order for these minute glowing spots to enlarge and for the fire to propagate and encompass the bulk of the charcoal, much time is needed, particularly considering that the propagation must take place in a downward direction.

The immersion of electric heater elements at or near the bottom of the spit is a generally better method in that it causes lighting in spots of charcoal pieces located at or near the bottom of the spit, which lighting thereafter quite rapidly propagates upwardly to include the bulk of the load of charcoal. One problem with immersion type lighters is that once the fire has been started they have to be removed, which creates a handling problem and one of finding a place where they can be deposited without risk of leaving burn marks and safely out of the reach of children for at least the time it takes them to cool.

The difference between using an electrical element immersed in the charcoal load in the barbecue and an electrical element disposed directly underneath the barbecue's metal pan and in accordance with the invention may not be very great when considering electrical elements only; however, when considering the possibility of utilizing other kinds of heating elements such as flame burners one necessarily finds that it is only in the case of the present invention that such other kinds of elements could be utilized. It appears that the element one could use for immersion in the charcoal load can only be an electrical element and particularly one, around the filament of which there is provided a proper amount of protective insulation and shielding.

According to the invention, there is proposed a further method of igniting barbecue fires which consists in applying relatively intense heat centrally under the barbecue spit, such as by means of a heating element disposed immediately under the bottom surface of the metal pan or spit of the barbecue. Such an element can be of any shape or form so long as it is one capable of producing the enough heat at the required temperature to achieve thereby the desired ignition effect on the charcoal pieces and particularly those in contact with the surface of the spit bottom with respect to the element. Such element can also be fixed permanently or removably secured in position under the fire pan or spit. It is found convenient to use for this purpose a stove element and to select one of the type most suitable in view of the intended mode of use of the barbecue. For instance, an electric range element would be a convenient choice for barbecues specifically designed for home or patio use, i.e. where finding an electrical outlet to connect the element would not be a problem.

However, for barbecues of a more portable type, such as one that campers would carry for use in nature and away from supply sources of electricity, the heating element would preferably be chosen among the various flame burners commonly used in camping stoves; these are generally burners of gaseous or liquid fuels such as propane, butane, naphtha, petrol, alcohol and such. In some cases, a complete barbecue of the invention might also have to include some means for storing a reserve of the required fuel and for dispensing same to the actual burner, i.e. in a barbecue intended for use by hikers, mountaineers and the like. In other cases, however, such as that a barbecue for use as a permanent part of the equipment in any camping vehicle where reserves and distribution systems of such fuels are usually provided, a barbecue of the invention would only need to additionally be provided with means whereby to permit connection of its burner to such system; i.e. in trailers and campers which are usually equipped with propane and/or butane gas systems.

A preferred embodiment of the invention is described herein after which has indeed been designed for use in connection with trailers and camping vehicles generally. It has the additional advantage of being versatile in that it combines all the characteristics of a normal stove with those of the barbecue of the invention in a single structure.

A better understanding of the invention will be had from consideration of the following disclosure of embodiments thereof, reference being made therein to the hereunto annexed drawing in which:

FIGS. 2 and 3 are perspective views of another preferred embodiment of the invention.

FIGS. 4 and 5 are further perspective views of the same embodiment of the invention as in FIGS. 2 and 3 but depicting a different mode of utilization thereof; a portion of FIG. 5 is shown in exploded view.

FIGS. 6 and 7 are perspective views of distinct alternative forms of the portion of the same embodiment that is shown exploded in FIG. 5.

FIG. 8 is a schematic representation in longitudinal cross-sectional view of a further alternative form for the exploded away portion of FIG. 5.

Figure 1:
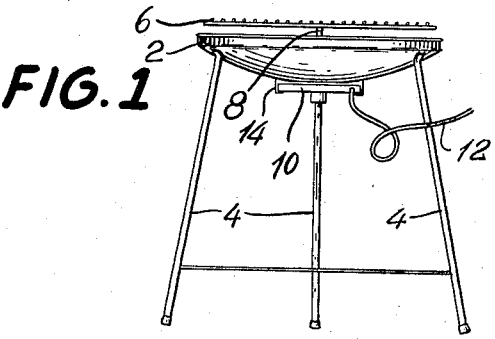
FIG. 1 is a schematic view in elevation of a first embodiment of the invention.

The various figures of the drawing are presented out of numerical order.

There is shown in FIG. 1 a very simple embodiment of the invention; it relates to a barbecue unit of a type most commonly employed for barbecuing around homes. It consists of a metal spit or pan 2, some support means or legs 4 therefor, a grill 6 and grill support means 8; in addition to the aforementioned conventional parts, there is provided in accordance with the invention a heat generator or heating element 10 disposed centrally under the bottom 2' of the pan 2 and, some flexible supply line 12 connected thereto at one end for connection to a supply source (not shown) of whatever fuel or electrical current the element 10 requires in order to produce the required intense heat. The heat produced by the element 10 is applied to the bottom walls 2' of the pan 2 and ultimately to the content of the pan, which in this instance would normally be charcoal. The portions of the charcoal pieces contacting the intensely hot surface of the bottom 2' of the pan are thus elevated to a sufficiently high temperature for the combustion thereof to be induced. Once combustion has thus been initiated, it is rapidly communicated upwardly to the remainder of the charcoal load in pan 2. The element 10 is retained in position by appropriate means such as members 14.

The FIGS. 2 through 10 of the drawing relate to a second embodiment of the invention and to a contemplated number of minor variations thereof; the invention in this instance takes the form of a combined camping stove and barbecue wherein double use is made of at least one of the heat generating members as stove elements and as fire starting elements for the barbecue portion thereof.

The combination stove-barbecue is formed as a portable sheet metal case 20 comprising a form sided rectangular frame 21 above and below which are respectively disposed rectangular covers 22 and 23. Each of covers 22 and 23 is hingedly secured along one edge thereof to the rear wall 24 of the rectangular frame 21.

Under cover 22 is the top of the stove portion of the device, and it may include a hinged plate 25 in which there is an aperture 26 through which is exposed a stove element 27.

In the front side of the frame 21 or side opposite that along the edges of which the covers 22 and 23 are hinged, there is a window 28, shown in FIGS. 4 and 5 through which is inserted a reversible element mounting assembly 29, which comprises a mounting plate 31 on one side of which a heating or stove element 27 is secured, a front plate 31 larger than the aperture 26, and a handle portion 32.

The drawer like element mounting assembly 29 is retained in position by means of a pair of channel members 33; members 33 are fixedly secured inside case 20 opposite window 28 and adapted to be slidably engaged by the sides of the plate 30.

The height of the front plate 30 is conveniently almost the same as that of the frame 21 so that when it lies against the surface of the frame the inturned cover flanges 22' and 23' respectively of the covers 22 and 23 will overlap the upper and lower edges thereof, to lock the assembly 29 in position. To pull out assembly 29, it is necessary to slightly lift both covers 22 and 23. It can be seen that handle 32 has a double purpose, i.e. as a drawer pull for the assembly 29 and as a carrying handle for the case 20 as a whole.

Figure 9:
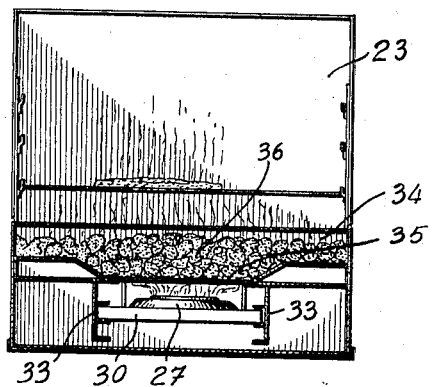
FIGS. 9 and 10 are schematic cross-sectional elevations of the same embodiment depicting one and the other respectively of two modes of utilization of same.
Figure 10:
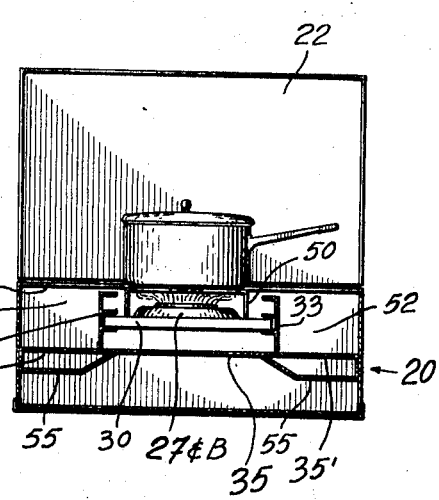

The inside of the case 20 is divided in two by a horizontal sheet metal wall or plate 35 referred to hereinafter as the bottom of the barbecue spit, it is located so as to constitute the bottom of a rectangular pan 34 which, when the structure is turned over, may be filled with charcoal as shown in FIGS. 4, 5 and 9. In order to light the barbecue fire, the assembly 29 is inserted in such position that the heating element 27 lies close to and faces the sheet metal plate 35 so that the heat therefrom is applied to the sheet metal and transmitted thereby to the charcoal 36 therein.

It is shown in FIG. 4 that, once the burning of the charcoal 36 has been properly started by means of the element 27, the element assembly 29 may be pulled out almost completely until only the rear corner portions of the plate 30 remain engaged in the tracks 33; when thus pulled out and as the lower edge of front plate 31 rests on the surface of the table (not shown) or the like surface on which the stove-barbecue has been deposited, the element 27 can then be used for heating food in pots and casseroles such as 37 in the normal manner, thus permitting the stove-barbecue device to be used simultaneously for barbecuing some food as well as for cooking other food as on an ordinary stove. It should be appreciated that this means that the ability to retain at least some usage as a stove while it is also being used as a barbecue is a particular and highly convenient characteristic that may be incorporated some designs of the embodiment of the invention such as shown in FIG. 4.

There is also shown in FIGS. 4 and 9, some side plates 38 hingedly connected to cover 23 and series of brackets or supports 39 secured at different levels thereon for holding the grill 40 at a properly selected distance above the incandescent charcoal bed 36. Such side plates 38 are also provided as means whereby to shield the burning charcoal from the wind.

Throughout the FIGS. 2 to 10, there is shown a number of stove elements 27 of various kinds each of which would be satisfactory for the objects and purposes of the invention; these are readily identifiable as electric range elements A, gas or alcohol flame burners B and naphtha flame burners C. Where an electric range element A is used, there may be provided in the surface of the front plate 31 appropriate means 41 for the connection thereto of an electric extension chord 42. Similarly where there is provided a gas or alcohol burner B, there might be provided some quick coupling connection means 43 and 44 for a supply hose 45. The male part 44 of the connection means also presents some adjustable air breathing valve 46. The female part 43 is disposed in the face of the front plate 31. If a naphtha stove element C is used, it should also include a vaporizer or generator tube 47 which may project through an aperture 48 and be connected to a pressurized supply source of naphtha, not shown in FIG. 7 by means of a tube 49 in conventional manner. The elements B and C are flame burners and as such elements are designed so that there should be some space between the burner and the pot or pan placed above it, it has been found convenient to provide spacer grill 50 for this particular purpose.

It is shown in FIG. 8 that, as an added commodity there may be provided stove elements 27 on both sides of the mounting plate 30. In this instance, it is seen that an electric range element A is disposed on one side and a gas or alcohol burner on the other side of the plate 30; any combination of the elements A, B and C can be made in similar manner. Such a combination is found to be most useful as it permits instantaneous conversion of the stove from one mode of operation to another according to the prevailing availability and/or accessibility of electricity and/or fuel for such operation in a particular camping area.

Figure 3:
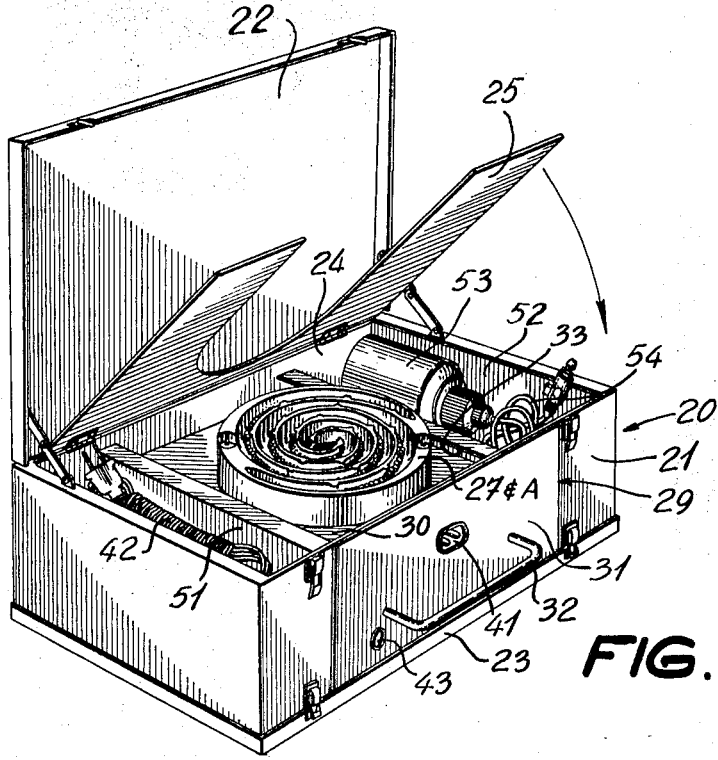

In FIG. 3, the top plate 25 is shown partly raised, thereby uncovering some compartments 51 and 52 disposed respectively to one and the other side of the tracks 33 wherein can conveniently be stored away various accessories of the stove such as an electric extension chord 42, a reserve tank of butane 53 and the flexible tube and adaptors 54 for connection of said tank to the stove.

I claim:

1. A combination barbecue and camp stove comprising:
  a. A shallow sheet metal pan having an essentially flat bottom wall and a peripheral side wall, said pan being adapted for the burning therein of a solid combustible fuel;
  b. Base support means for holding said pan at a distance above and in parallel relation to the underlying ground surface;
  c. Track means including spaced channel members fixedly secured with respect to said base support means and extending in a plane parallel to and a short distance below the said bottom wall of the pan;
  d. A plate slidably engaging said track means and longitudinally displaceable therealong toward and away from a terminal position wherein it lies centrally under said bottom wall and in a plane parallel thereto, and at a level intermediate said bottom wall and the ground surface;
  e. A stove element fixedly mounted on said plate and adapted to lie in heat transferring proximity to said bottom wall as said plate lies in said terminal position, whereby to transmit the heat generated by the said stove element through the bottom wall of the pan to the solid combustible fuel therein and thereby initiate the self-sustained combustion thereof;
  f. A barbecue grill and means for holding same in a plane parallel to and centrally above the said pan
  h. wherein said plate may be moved along said track means from said terminal position to a further position wherein, as it remains engaged between said tracks, the stove element thereon lies clearly away from under the bottom wall and the barbecue pan generally, to permit normal further usage of said stove element as such when said plate lies in said further position.

2. A combination stove as claimed in claim 1, wherein said plate is reversible and there is a further stove element fixedly mounted on the reverse side thereof, said further stove element being of a differently energizable type than the first mentioned stove element.

3. A stove comprising:
  a. A box-like housing presenting a bottom panel, four side panels and a top panel, said top panel being hingedly connected to one of said side panels;
  b. An aperture in the side panel that lies opposite the side panel to which the top panel is hingedly connected;
  c. A reversible assembly of stove elements mounted for sliding displacement in and out of said box-like housing through said aperture; said assembly of stove elements comprising a plate, a first stove element fixedly mounted on one side thereof and a second stove element similarly mounted on the reverse side thereof; said plate having laterally projecting longitudinal edges;
  d. Track means disposed in side said housing opposite the said aperture therein and adapted to be slidably engaged by the said longitudinal edges of said plate;
  e. A handle at the outer end of said plate and a guard plate in a plane normal to that of the said plate and adapted to overlie said aperture in edge overlapping relationship when said assembly lies as fully inside the housing as it can; said guard plate presenting upper and lower edges which are respectively equidistant from the nearest surface of the said plate and adapted lie in the upper plane of housing, whereby to provide support for holding the plate horizontally when the housing is disposed upside down on a flat surface and said stove elements are disposed completely outside the said housing with only a projecting terminal portion of the said plate remaining engaged in the track means; the bottom panel of said housing being hingedly connected to and along the lower edge of one of the side panels, said housing presently a fixed further panel parallel to and at a level intermediate the top and bottom panels thereof and under the said aperture; said fixed further panel defining a box-like barbecue spit in the lower portion in said housing wherein as said housing is disposed upside down, to burn solid combustible fuel.

* * * * *